(12) United States Patent
Holzgrafe (10) Patent No.: US 6,594,441 B1
(45) Date of Patent: Jul. 15, 2003

(54) METHOD AND APPARATUS FOR VIDEO TAG SIGNAL RECOVERY USING VARIOUS TECHNIQUES TO REGENERATE AND RE-RECORD THE TAG SIGNAL

(75) Inventor: James R. Holzgrafe, Morgan Hill, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/452,354

(22) Filed: Dec. 1, 1999

(51) Int. Cl.[7] ................................................. H04N 5/91
(52) U.S. Cl. ..................... 386/94; 386/95; 386/102; 386/108; 380/201; 380/203
(58) Field of Search .......................... 386/94, 95, 102, 386/108; 380/203, 201, 217, 239

(56) References Cited

U.S. PATENT DOCUMENTS

| | | |
|---|---|---|
| 5,778,140 A | 7/1998 | Okamoto |
| 5,889,868 A * | 3/1999 | Moskowitz et al. .......... 380/28 |
| 5,915,027 A * | 6/1999 | Cox et al. ..................... 380/54 |
| 5,940,134 A * | 8/1999 | Wirtz ......................... 348/473 |
| 6,122,403 A * | 9/2000 | Rhoads ....................... 382/233 |
| 6,374,036 B1 * | 4/2002 | Ryan et al. .................... 386/94 |

FOREIGN PATENT DOCUMENTS

| | | |
|---|---|---|
| DE | 19803846 | 4/1999 |
| WO | WO9948290 | 9/1999 |

* cited by examiner

*Primary Examiner*—Vincent Boccio
*Assistant Examiner*—James A. Fletcher
(74) *Attorney, Agent, or Firm*—George Almeida

(57) ABSTRACT

In typical prior art generational copy protection processes, a video tag signal is added to a watermarked and/or copy protected video signal to prevent the production of unauthorized second generation copies and the playback of illicit second generation copies. This application discloses a means for defeating the tag signal/watermark copy protection process. To this end, various embodiments are disclosed by which the tag signal is recovered, converted to a selected tag representation and is carried or stored in some manner, concurrently with the recording of a first generation copy of the video signal, which may or may not be tagless. The first generation copy is played back and the tag representation is converted to a regenerated tag signal which is selectively re-inserted in the reproduction of the first generation copy prior to recording a second generation copy, which now is playable.

51 Claims, 7 Drawing Sheets

(RECORDING)

FIG. 1
(RECORDING)

FIG. 2
(PLAYBACK)

FIG. 3
(RECORDING)

FIG. 4
(PLAYBACK)

FIG. 5
(RECORDING)

FIG. 6
(PLAYBACK)

FIG. 7
(RECORDING)

FIG. 8
(PLAYBACK)

FIG. 9
(RECORDING)

FIG. 10
(PLAYBACK)

METHOD AND APPARATUS FOR VIDEO TAG SIGNAL RECOVERY USING VARIOUS TECHNIQUES TO REGENERATE AND RE-RECORD THE TAG SIGNAL

BACKGROUND OF THE INVENTION

The present invention relates to copy protection systems and in particular to a technique and associated implementations which enable the recovery and reproduction of a tag signal in a watermarked and/or copy protected video signal.

The tag signal is added to the video signal (i.e., program material) explicitly and carries an information content that relates to the content of the invisible watermark signal on that same video signal. The tag signal is time-varying and of fixed duration, and simply repeats for the length of the protected program material. The tag signal is designed to be non-reproducible by selected conventional recording/reproducing means such as consumer digital VCRs, whereas the watermark is designed to be carried along in the active video through any and all processes. Compliant recorder/reproducers, detecting the absence of the tag signal on watermarked material, will interpret the absence as indicating that the program is indeed a copy, and thereby refuse to record or reproduce the signal. Such a tag/watermark system is intended to prevent the production of unauthorized second generation copies as well as the playback of illicit second generation copies.

By way of example, a "tag" (that is, a tag signal) may comprise a small burst of color inserted in a corner of the active video picture. The burst of color is too small and too finely detailed to be reproduced by compliant recorder/reproducers. That is, the tag is a high frequency signal that, in this example, is outside the bandwidth of the low frequency bandwidth chroma channel of the recorder/reproducers.

In another example, a tag may comprise a series of pulses inserted outside of the active video picture in the blanking interval. Because of well known bandwidth limitations, digital recorders conserve bandwidth by not recording blanking intervals. The timing information provided by the blanking intervals is not required in digital recorders since the video signal is stored digitally. When digital reproducers play back the video signal, they simply insert a stored blanking interval in the proper location. It follows therefore, that a tag inserted in the blanking interval is discarded along with the blanking interval during a recording process. When the digital recorder/reproducer reconstructs the video signal and blanking intervals on playback, the tag is not available and thus is not reproduced.

By way of example only, a typical tag signal used in a generational copy control system may be found in co-pending U.S. Provisional Application Serial No. 60/088,682 filed Nov. 5, 1999 entitled "Generational Copy Control of a Digital Video Signal."

SUMMARY OF THE INVENTION

The present invention comprises a method and apparatus by which the tag signal in copy protected program material, that is, video signals, may be detected, stored and then added back to the generally tagless output of the copy, thereby enabling the production of further (second generation and beyond) playable copies of the protected program.

To this end, the tag signal is recovered from the copy protected program material, that is, read, by conventional means. As an example, if the tag signal is a pulse or series of pulses, such as the aforementioned burst of color in the picture or the pulse outside the picture, at a specific location or locations in the video signal waveform, appropriate timing means may be provided to select the desired location(s). At these locations a pulse-slicer may be used to convert the tagged video waveform into a conventional logic-level signal.

In accordance with an embodiment of the present invention, herein termed an inframe tag embedded technique, the recovered tag signal (which was located in the blanking interval) is converted into an in-frame video component (that is, a "tag representation") by any suitable means. The in-frame component is then added to the program video signal from the original source and the resultant composite signal is recorded conventionally by a generally compliant first generation recorder which may, or may not, strip off the original tag, while the added in-frame component is recorded as part of the picture information. Upon playback of the first generation copy, the added in-frame component is detected and a regenerated tag waveform conforming to the original specification is synthesized in real time. The regenerated tag waveform is added with the playback video which is then recorded conventionally on a generally compliant second generation recorder to produce a second generation copy which is fully playable.

In accordance with an alternative embodiment of the invention, herein termed a parallel recorder/reproducer technique, the recovered tag signal is converted to a video signal by any appropriate means, for instance by amplitude modulation, and is recorded as a "tag representation" on a separate recording means for the entire length of the program material, concurrently and synchronously with the recording of the program material on the primary recorder. Upon playback, the two recorder/reproducers are again synchronized and the tag information in the output of the separate recording means is recovered, and from that information the original tag signal waveform is synthesized in real time at the appropriate instants. The synthesized tag signal waveform is then added in real time to the program material which is then suitable for input to a compliant second generation recorder for playback.

In accordance with another alternative embodiment of the invention, herein termed a computer storage technique, a pulse stream represented by the recovered tag signal, at one pulse per video field, is converted into a digital sequence, that is, a "tag representation," for the duration of the program material. The complete sequence of tag information is then stored in a computer file in any convenient form, for example as a straight binary file, etc. The second generation copy is then made by playing back the first generation copy, and simultaneously reading the previously written file in order to synthesize the regenerated tag waveform in real time. The tag waveform is then added to the tagless video signal played back from the first generation copy prior to supplying the combined signal to the compliant second generation recorder.

In accordance with another alternative embodiment of the invention, herein termed a correlation technique, since the exemplary tag bit sequence used in the previous computer storage embodiment repeats, it is not necessary to store the sequence for the whole program material. It suffices to store only one cycle thereof. It is, however, necessary to determine the exact length of the actual tag bit sequence, in order to repeat it properly. This is most easily done by storing a number of bits well in excess of any reasonable tag sequence length, such that the stored sequence contains at least one complete digital tag length. Conventional autocorrelation techniques are then used to determine the actual digital tag length, and one sequence's worth of tag bits are then stored in a computer file. The second generation copy is then made by playing back the first generation copy, and simultaneously and repetitively reading the previously-written file in order to synthesize the requisite tag waveform in real time. Then, the tag waveform is added to the tagless video from the first generation copy before it is fed to the compliant second generation recorder.

In accordance with still another alternative embodiment of the invention, termed a hardware correlation technique similar to the computer storage and correlation embodiments, since the tag bit sequence repeats, again it is not necessary to maintain the sequence for the whole length of the program material. It suffices to determine only one cycle thereof while determining the exact length of the actual digital tag sequence in order to repeat it properly. This is achieved in this embodiment by a hardware autocorrelator. The digital sequence from the tag recovery unit is applied to a binary shift register of length adequate to store a pulse sequence well in excess of the expected tag signal length. The shift register is supplied with a matching array of logical exclusive-or ("XOR") gates. The output of each stage of the shift register is applied to one input of the associated array of XOR gates. The digital sequence from the tag recovery unit is also directly applied in parallel to the other input of all of the XOR gates in the array. The output of the XOR associated with the stage in the shift register corresponding to the length of the tag bit sequence will produce constant logical "1's", since the direct input will exactly match the delayed input. The output from each XOR gate is collected in an associated accumulator and the accumulator with the highest value indicates the length of the tag bit sequence.

Once the length of the tag bit sequence is determined, that many consecutive bits from the input tag bit stream are stored locally. The second generation copy is then made as described in the immediately previous embodiment.

BRIEF DESCRIPTION OF THE DRAWINGS

FIGS. 5, 6 also are used herein to illustrate a correlation technique of the present invention.

DESCRIPTION OF THE PREFERRED EMBODIMENTS

Various preferred and exemplary components of the embodiments of the present invention and of the method of performing the intended functions are illustrated with reference to the functional block and schematic diagrams in the figures. The specific illustrations are intended for purposes of example only, and it is understood that those skilled in the relevant art will appreciate that various additional modifications are readily apparent within the scope of the present invention.

For purposes of description, the tag signal (hereinafter called a "tag") in this example, comprises the aforementioned series of pulses which are inserted in the blanking interval outside the active picture of the video signal; that is, are "out-of-frame". Obviously, other forms of the tag could be used instead, with a corresponding change in the processes of recovering, converting and/or synthesizing the tag.

Figure 1:
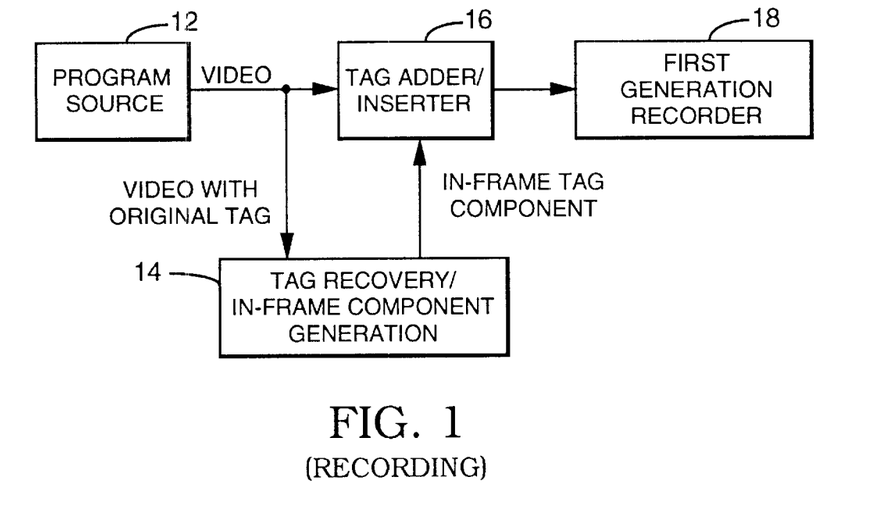
FIGS. 1 and 2 are functional block diagrams illustrating recording and associated playback systems respectively of an in-frame tag embedded embodiment of the present invention.
Figure 2:
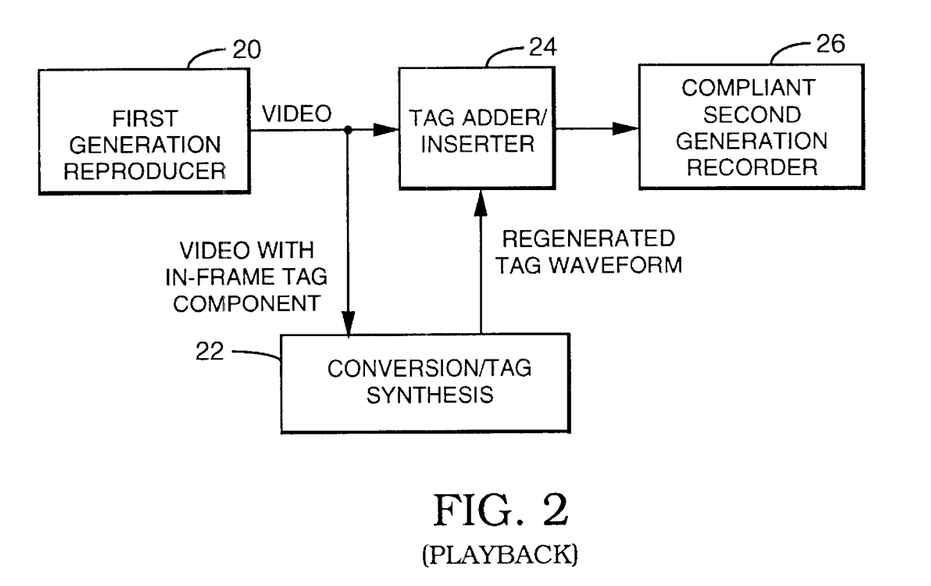

The FIGS. 1 and 2 are functional illustrations of the in-frame tag embedded embodiment of previous mention. The basic concept in this embodiment is to detect the tag in the blanking interval, and move it into the active picture so that it can be recorded as an in-frame tag component along with the program material, such as for example, a video signal. Upon playback of the recording, the in-frame tag component is converted back to the original tag and is inserted back in its original out-of-frame location in the blanking interval. Thus, one way of saving the tag for a subsequent recording is to put the tag in the video signal. This technique causes an artifact in the picture, the effects of which however can be minimized by the judicial selection of the tag component which is inserted in-frame in the active picture, that is, by inserting for example, a small burst of color, pulse array, etc., in a corner of the active video picture.

Figure 12:
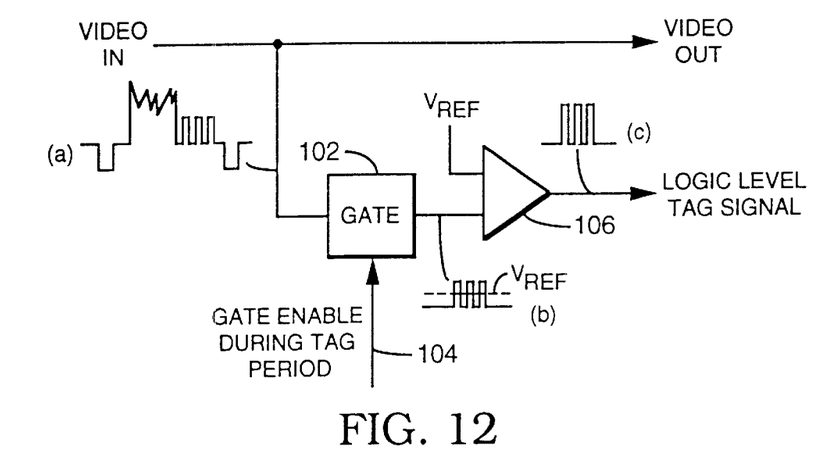
FIG. 12 is a schematic diagram illustrating a tag recovery circuit of the FIGS. 1, 3, 5, 7, 9.

Referring to FIG. 1, a copy protected video signal containing a watermark and the associated tag, is supplied by a program source 12 in a recording process. In accordance with the invention, the tag is recovered from the video signal by suitable means such as for example an in-frame tag recovery/in-frame component generation means 14, which first detects, i.e., reads, the tag (for example, with a circuit such as depicted in FIG. 12) and then generates an in-frame component corresponding to the tag (such as using a circuit of FIGS. 13A–13C). The in-frame tag component may comprise for example a small block of white pixels inserted in one corner of the video frame, wherein the in-frame tag component amplitude is set to 100 IRE for a logical "1" and 0 IRE for a logical "0". The in-frame tag component is added to the video signal with original tags in a tag adder/inserter means 16. The resulting composite video signal is recorded conventionally in a (generally compliant) first generation recorder 18 which may, or may not, strip off the original out-of-frame tag as intended, but records the in-frame tag component as part of the video picture.

Referring to FIG. 2, in the playback process of the first generation copy, the video signal containing the in-frame tag component is applied from a first generation reproducer 20, to a conversion/tag synthesis means 22. It is readily apparent that the recorder 18 and reproducer 20 of the FIGS. 1, 2 (and the following FIGS. 3–10) may be a conventional recorder/playback machine. A converting portion of means 22 detects the in-frame tag component and from it, a synthesizing portion of the means 22 synthesizes in real time a regenerated tag waveform conforming to the original tag contained in the video signal supplied by source 12 of FIG. 1. The regenerated tag waveform is added/inserted with the playback video from the reproducer 20 in a tag adder/inserter means 24, to reconstruct a video waveform functionally identical to the original. This video signal is then recorded conventionally on a compliant second generation recorder 26 to produce a second generation copy of the video signal which contains the watermark but removes the tag signal as intended, and thus is fully playable but not recordable.

The term "in-frame" is meant to describe any portion of the video signal which is actually recorded by the recorder and reproduced (rather than synthesized) by the playback unit. Some digital recorders, for instance, do in fact record and reproduce portions of the horizontal and/or vertical blanking intervals ("HBI" and "VBI"), and in these systems the "in-frame" component could be located in the reproduced portion of the blanking, thereby not impacting the video quality in any way.

Further, any of a number of differing configurations may be used for the in-frame component, including but not limited to an amplitude-modulated white pulse as noted above, an amplitude-modulated colored pulse, a position-modulated pulse of any suitable configuration, a colored patch whose color is modulated to carry the tag information, etc. Similarly, the tag information could, with complete generality, be carried as an audio signal, subject only to the time-synchronization requirements of the compliant tag detector. Further, the in-frame tag components could either be removed from the picture before applying the signal to the second generation recorder 26, or they could be left in place.

Figure 3:
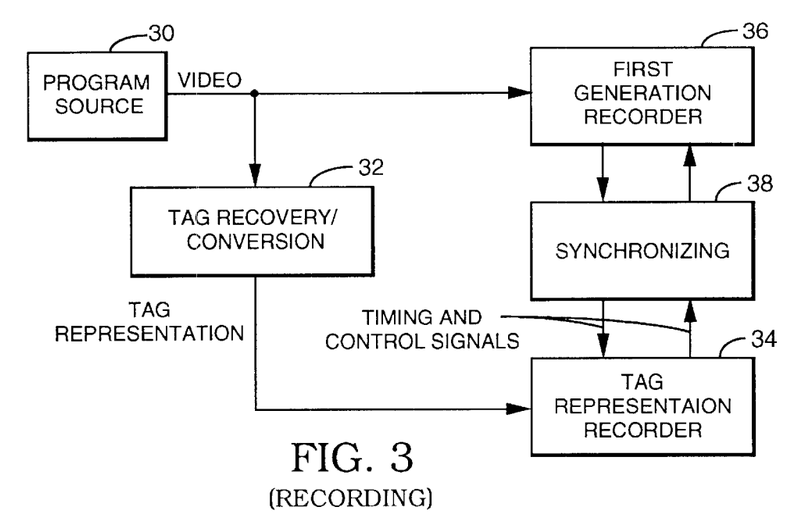
FIGS. 3 and 4 are functional block diagrams illustrating recording and associated playback systems respectively of an alternative embodiment of the present invention employing parallel recorder/reproducers.
Figure 4:
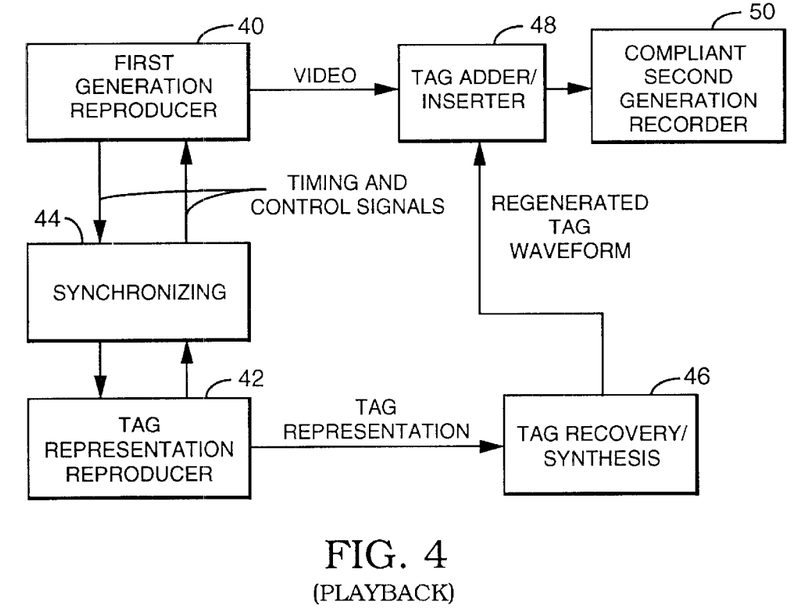

Referring to FIGS. 3 and 4, the parallel recorder/reproducer embodiment of previous mention is functionally illustrated. The basic concept here is to carry and thus save a copy of the original tag as in the embodiment of FIGS. 1, 2, but the tag is recorded in a separate suitable recording means rather than in the video signal itself, and is played back in synchronization.

To this end, in the recording process of FIG. 3, the copy protected video signal with watermark and tag is supplied via a program source 30, similar for example to source 12 in FIG. 1. The tag is recovered from the video signal via a tag recovery/conversion means 32 generally similar in recovery function to the tag recovery/in-frame component generation means 14 of FIG. 1. The recovered tag is converted to a video (or audio) signal hereinafter termed a "tag representation," by some means such as for instance by modulating the amplitude of a flat-field video signal with for example 100 IRE and 0 IRE for a logical "1" and "0", respectively. The tag representation in FIGS. 3 and 4 (as well as in FIGS. 5-11 described below), is understood to carry tag information in a manner consistent with the in-frame tag component, that is, tag representation, of FIGS. 1 and 2. The converted tag information is recorded in this example on a (second) tag representation recorder 34 concurrently with the recording of the video signal on a first generation recorder 36. The tag representation is recorded for the length of the program material (for example, video signal) and the two recorders are synchronized by means of suitable synchronizing means 38, such that the two signals may be later properly combined.

Figure 14A:
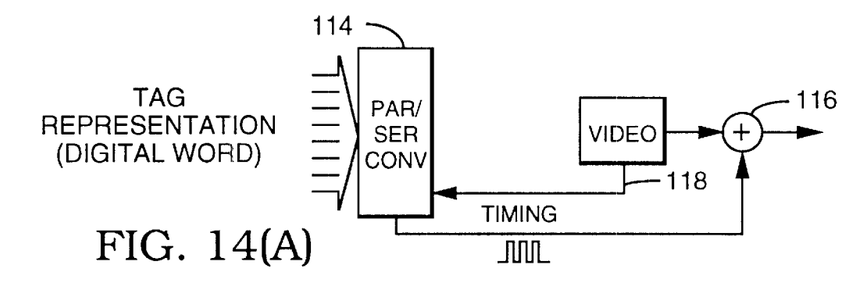
FIGS. 14A–14C are schematic diagrams illustrating several tag synthesis circuits of the FIGS. 2, 4, 6, 8, 10.
Figure 14B:
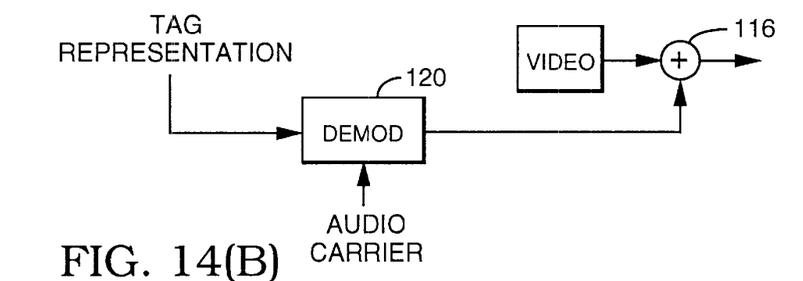
Figure 14C:
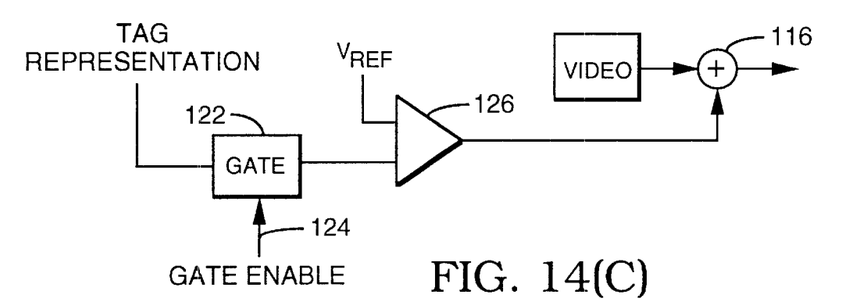

As depicted in FIG. 4, upon playback, a first generation reproducer 40 and a (second) tag representation reproducer 42 are synchronized by means of synchronizing means 44 which responds to the synchronizing means 38 of FIG. 3. As previously mentioned, it is readily apparent that the first generation recorder 36 and reproducer 40 may be the same recorder/playback machine. Likewise, the tag representation recorder 34 and reproducer 42 may be the same or separate recording or storage means. The output of reproducer 42 carrying the recorded tag representation is applied to a tag recovery/synthesis means 46 which detects the tag information, in this example, by discriminating between a 100 IRE or 0 IRE flat-field. The synthesizing portion of the means 46 (such as depicted in FIGS. 14A–14C) synthesizes in real time the original tag waveform at the appropriate instants in the video signal. The regenerated tag waveform is then added in real time to the program material from the reproducer 40 in a tag adder/inserter 48, and the composite signal is supplied to a compliant second generation recorder 50 as in FIG. 2, for playback.

The tag representation may be converted to video for recording in any number of ways, including but not limited to amplitude modulation of an in-frame flat-field or pulse, position modulation of an in-frame pulse, frequency or phase-modulation of a chroma/subcarrier signal, etc. It may also be treated as (or converted to) an audio signal employing any suitable modulation process such as, but not limited to, frequency-shift keying, phase-shift keying, amplitude modulation, etc., and recorded on one or more of the audio channels of the separate recorder 34 of FIG. 3. In all of these embodiments, the modulation and subsequent recovery and reconstitution of the tag signal may use conventional means as appropriate, as exemplified by, the reproducer 42 and means 46 of FIG. 4, and FIGS. 14A–14C.

Figure 5:
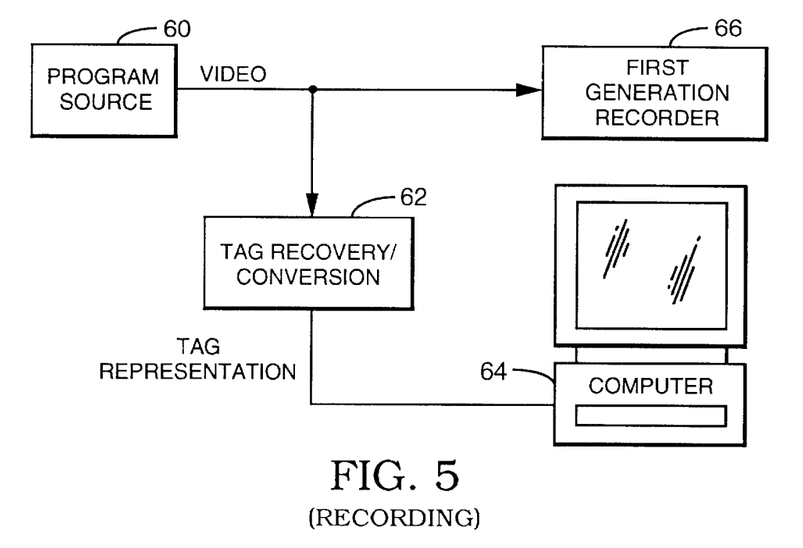
FIGS. 5, 6 and 7, 8 are functional block diagrams illustrating recording and associated playback systems respectively of further alternative embodiments of the present invention employing computer storage techniques.
Figure 6:
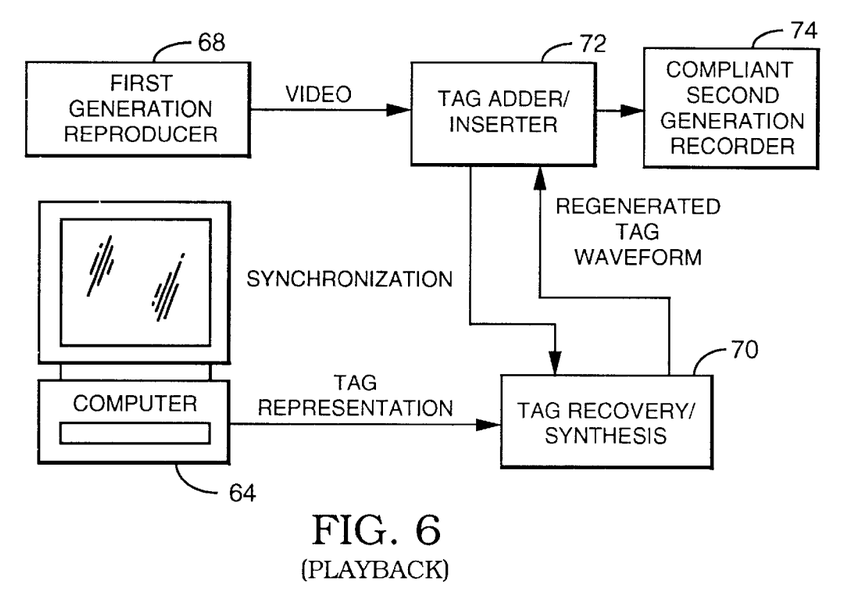

Referring to FIGS. 5 and 6, a first computer storage embodiment of previous mention is functionally illustrated. Similarly, FIGS. 7 and 8 functionally illustrate a second computer storage embodiment.

FIG. 5 illustrates a recording process wherein a program source 60 supplies a copy protected video signal having a watermark and tag. The tag is recovered from the video signal via a tag recovery/conversion means 62 generally similar in recovery function to the equivalent means of FIGS. 1 and 3. The tag recovery/conversion means 62 however provides for example, digital data in the form of a pulse stream corresponding to a tag representation. By way of example, the digital data of the tag representation may comprise one pulse per video field, converted into a digital sequence, whereby if the tag of a given field represents a logical "1", a logical "1" is added to the digital sequence, and vice versa. Thus, at one bit per field, the complete digital sequence for a conventional two hour movie comprised of approximately 432,000 video fields would consist of approximately 432,000 bits or, more conventionally, about 54 kilobytes.

The complete digital sequence is then stored in a computer file in a computer 64 in any convenient form; for example as a straight binary file, or perhaps as a text file divided into groups of eight bits with each group represented by a variable type "unsigned char." A first generation recorder 66 similar to recorders 18 and 36 of FIGS. 1 and 3, records the first generation copy of the video signal from the source 60 with the tag stripped away as intended by the tag copy protection process.

In the playback process of FIG. 6, the first generation copy without the tag is reproduced in a first generation reproducer 68 similar to reproducers 20 and 40 of FIGS. 2 and 4, while simultaneously reading the previously written file in the computer 64 in order to synthesize the requisite tag sequence in real time. The sequence of bits of the resulting tag representation is then conventionally converted to an appropriate regenerated tag waveform in real time by a tag recovery/synthesis means 70 similar to the means 46 of FIG. 4. The regenerated tag waveform is mixed with (added to) the tagless video from the reproducer 68 in a tag adder/ inserter means 72 and then is supplied to a compliant second generation recorder 74 similar to the previous recorders 26 and 50 of FIGS. 2 and 4, for playback.

The bit sequence of the tag representation in this example, once converted into digital data, need not be stored in a file as such (that is, written to a non-volatile storage medium) since it is so small it can easily be simply retained in volatile memory, e.g., random access memory (RAM) or even cache, so long as the computer 64 is not turned off between the making of the first generation copy and the making of the second generation copy. Indeed, in a normal, modem personal computer, it is likely that the sequence would actually be stored in both locations at one time or another. Even if the intention were simply to retain the sequence in RAM, it might well get temporarily written to a "swap file" on the hard drive by the computer's operating system during the computer's normal operation.

If additional pulses, beyond one pulse per field, are contained in each video field, then additional proportional storage will be required.

Figure 7:
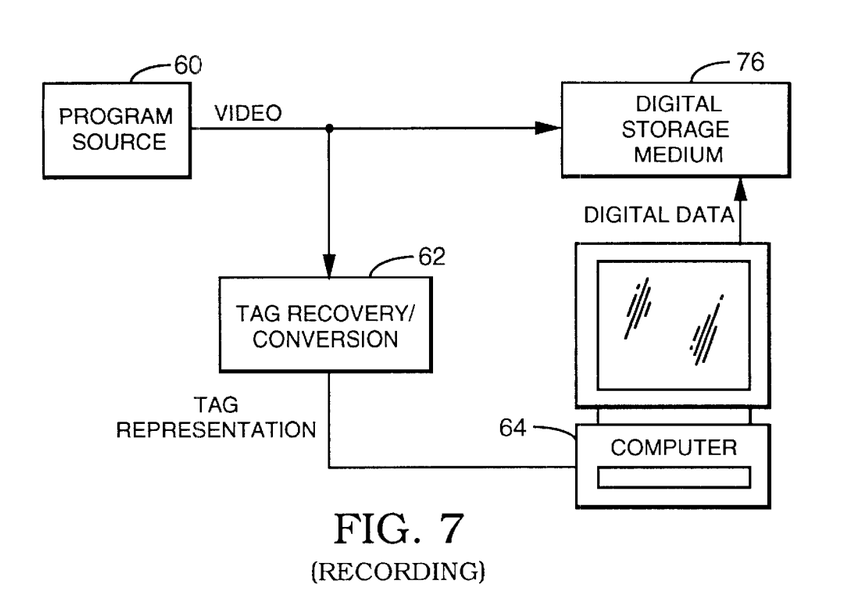
Figure 8:
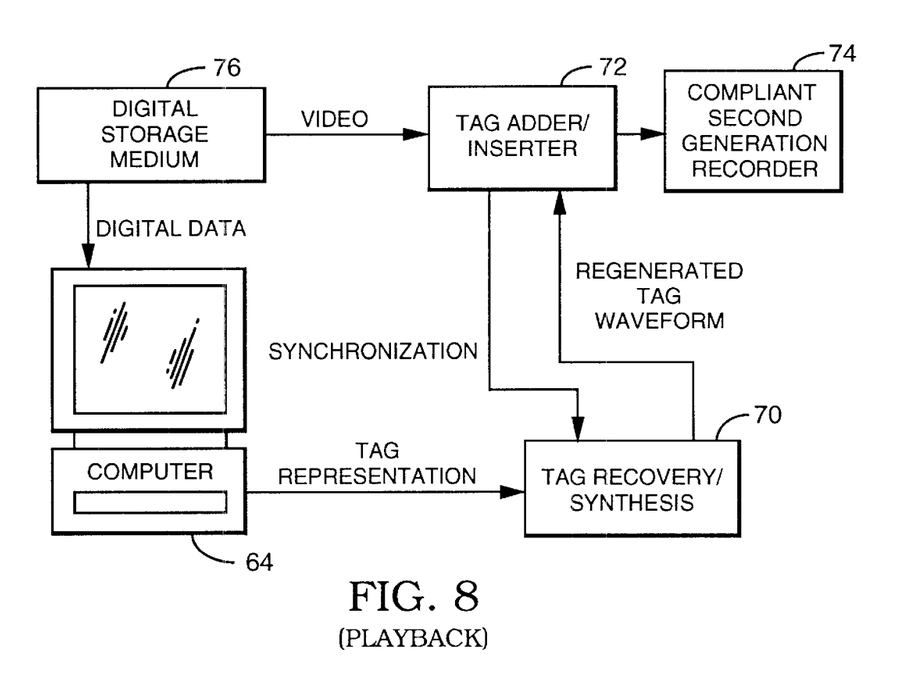

FIGS. 7, 8 depict an alternative embodiment of the computer embodiment of FIGS. 5, 6 wherein, in the recording process the first generation recorder 66 shown in FIG. 5 could actually be a digital volatile or non-volatile storage medium 76 either internal or external to the computer 64 as shown in FIG. 7. Additionally, the tag recovery/conversion means 62 could also be located internal to the computer. Finally, the tag representation shown going into the computer 64 could actually be stored in the same digital storage medium 76 as the video signal. In this case, the video signal would have first been converted from analog to digital and optionally compressed using any one of a number of compression algorithms. It is to be understood that the storage medium 76 could be part of computer 64.

The advantage of this embodiment is that if the storage medium is removable, then it can be transported as a single item to someone else. By containing both the video and the digital data corresponding to the tag representation, this single item thus contains all of the information necessary to allow anyone to make additional copies. This is illustrated in FIGS. 7, 8, wherein FIG. 8 illustrates a representation of a playback system. The tag representation is now shown being extracted from the digital storage medium 76, which again could be internal or external to the computer 64. Likewise, the tag recovery/synthesis means 70 and tag adder/inserter means 72 could be internal or external to the computer 64.

The correlation technique of previous mention comprises a further embodiment of the invention and may be described using the configurations of FIGS. 5, 6. As described hereinbefore with reference to the first computer embodiment of these figures, a digital sequence representative of the tag representation is generated for example by the tag recovery/ conversion means 62 of FIG. 5, and then suitably stored in a computer file (computer 64), digital storage medium 76, etc., for subsequent addition to the previously recorded first generation copy of the video signal. However, in accordance with this correlation embodiment, since the tag bit sequence repeats, it is not necessary to store the sequence for the whole program material. It suffices to store only one cycle thereof. That is, if the actual tag sequence consists of for example a 64-bit pattern repeated for the duration of the program material, only those 64 bits need to be stored. It is, however, necessary to determine the exact length of the actual tag sequence, e.g., 64 bits, in order to repeat it properly. This is most easily done by storing a number of bits well in excess of any reasonable tag sequence length, such that the stored sequence contains at least one complete digital tag length. Conventional autocorrelation techniques are then used to determine the actual sequence length, and one sequence's worth of tag bits corresponding to the tag representation are then stored in the computer file. The bits may be stored in any convenient form, for example as the straight binary file, the text file, etc., of previous mention. The second generation copy is then made by playing back the first generation copy via the first generation reproducer 68, and simultaneously and repetitively reading the previously written file via the computer 64 in order to synthesize the requisite tag sequence in real time. The sequence of bits read from the file is conventionally converted to a regenerated tag waveform in real time via the tag recovery/synthesis means 70 (see also FIGS. 14A–14C). The tag waveform is mixed with (added to) the tagless video from the first generation copy by the tag adder/inserter means 72 before it is fed to the second generation recorder 74 for playback.

As described above in the computer embodiment, once converted into digital data, the tag representation can be retained in RAM, cache, etc., since it is small, as long as the computer 64 is not turned off between copy generations. Also, the tag representation can be stored, that is, saved, in both locations and/or in a swap file in a personal computer, as previously mentioned.

Further, the repetition of the tag sequence comprising the tag representation, may be achieved either in hardware or in software. In particular, the computer 64 may continuously and repetitively output the tag sequence for the duration of the program material, essentially in real time. Alternatively, in the 64-bit tag sequence of previous mention, the tag length may be downloaded once to the tag recovery/ synthesis means 70 which may then repetitively read its own memory to reproduce the sequence for the duration of the program material.

Figure 9:
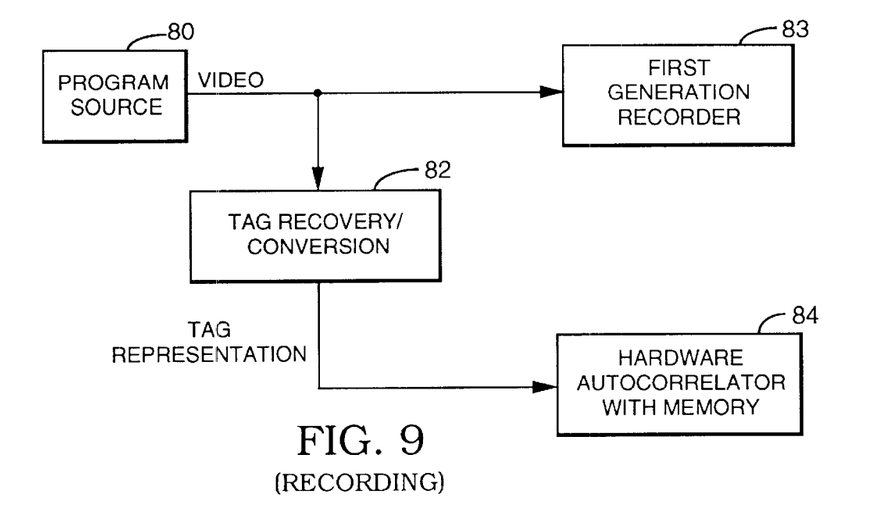
FIGS. 9 and 10 are functional block diagrams illustrating recording and associated playback systems respectively of still another alternative embodiment of the present invention employing hardware correlation technique and associated means.
Figure 10:
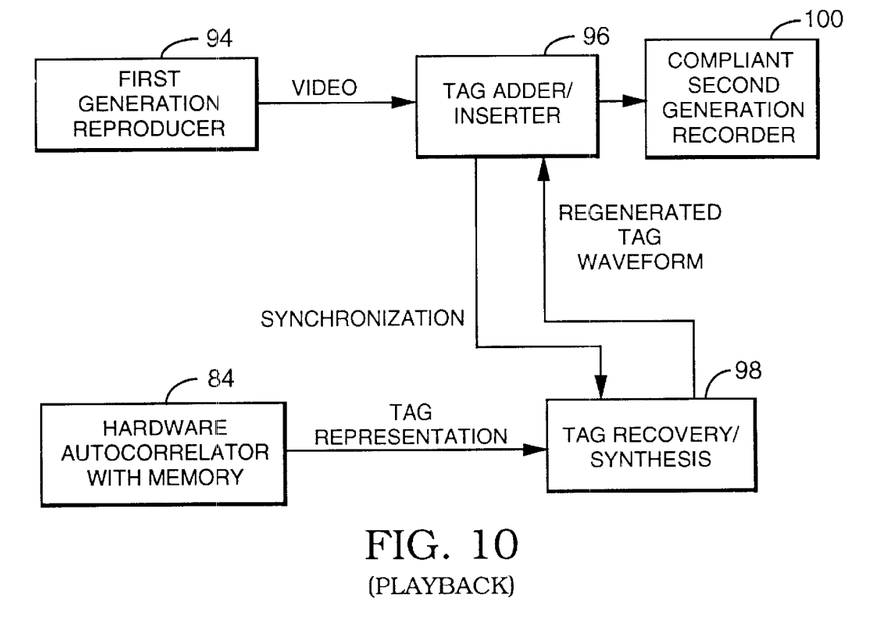

FIGS. 9 and 10 illustrate the hardware correlation embodiment of previous mention, which is generally similar in concept to the correlation embodiment described with reference to FIGS. 5, 6, but which employs hardware to perform the correlation process, with the advantage of increased operating speed over the software embodiment.

To illustrate, FIG. 9 depicts a recording process wherein a copy protected video signal with watermark and tag is supplied via a program source 80 to a tag recovery/ conversion means 82 similar to means 32 and 62 of FIGS. 3, 5 and 7. The video signal also is supplied to a first generation recorder 83 which records a first generation copy while stripping away the tag. Meanwhile, the tag is recovered from the source 80 video signal and is converted in the means 82. Since the resulting tag sequence repeats, it suffices to determine only one cycle thereof which, however, requires the determination of the exact length of the actual tag sequence, as disclosed above.

Figure 11:
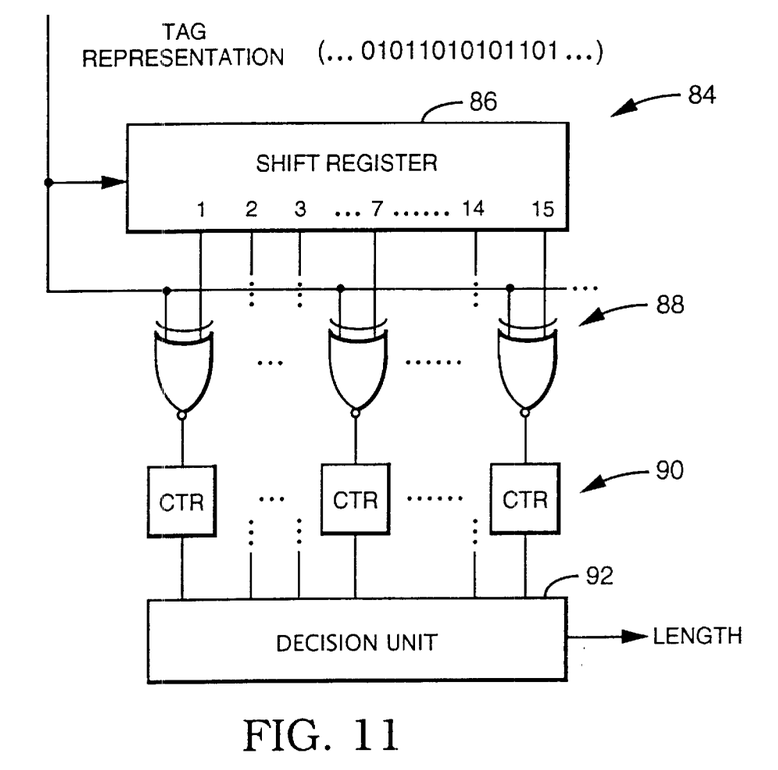
FIG. 11 is a block/schematic diagram illustrating a hardware autocorrelator circuit of the invention.

To this end, referring also to FIG. 11, the repeating tag sequence is supplied as a tag representation to a hardware autocorrelator 84 with memory. The tag representation comprising the digital tag sequence from the tag recovery/ conversion means 82 is applied in this example to a binary shift register 86 (FIG. 11) of length adequate to store a pulse sequence well in excess of the expected tag length. The shift register 86 is supplied with a matching array of logical exclusive-or ("XOR") gates 88. The output of each stage of the shift register is applied to a respective input of the associated XOR gate. The digital sequence of the tag representation from the tag recovery/conversion means 82 is also directly applied in parallel to the other input of all of the XOR gates 88 in the array. The output of the XOR gate associated with the stage in the shift register 86 corresponding to the length of the tag bit sequence, will produce constant logical "1's", since the direct input will exactly match the delayed input. All other XOR gates will produce "1's" and "0's" pseudo-randomly. The output from each XOR gate is collected via respective counters 90 comprising, for example, an accumulator, which in turn are coupled to a decision unit 92. The accumulator output with the highest value indicates the length of the tag bit sequence. Note that, if the shift register 86 length is equal to or longer than twice the length of the tag bit sequence, the accumulators corresponding to integral multiples of the tag bit sequence length will all, identically, contain the maximum value. In this case, the shortest indicated tag bit sequence length should be used.

Once the length of the tag bit sequence is determined by the decision unit 92, the corresponding number of consecutive bits from the input tag bit stream are stored in the autocorrelator 84 memory. It is not necessary to determine the data framing, since the sequence repeats forever. The extracted tag bits may be stored in any convenient form, but for normal short sequences the simplest implementation is as a single binary word in a nonvolatile local data register corresponding to the autocorrelator 84 memory.

In the playback process depicted in FIG. 10, the first generation copy is supplied from a first generation reproducer 94 to a tag adder/inserter 96. As the first generation copy is played back, the stored tag bits forming the tag representation are simultaneously and repetitively read from the local data register (that is, autocorrelator 84 memory), and synthesized via a tag recovery/synthesis means 98 in real time. The sequence of bits read from the memory thus is conventionally converted to an appropriate regenerated tag waveform in real time and the tag waveform is mixed with (added to) the tagless video from the first generation copy in the tag adder/inserter means 96 before it is fed to a second generation recorder 100 for playback.

The recovered tag sequence of the tag representation need not be stored in a separate local data register. Another approach is to make the shift register 86 itself non-volatile, and then simply to arrange the shift register control system such that, as soon as the tag sequence length is established, data input stops and the excess stages are disconnected from the end of the shift register. Then the output of the last valid stage of the shift register is connected to the input stage, and the now-circular shift register can clock out a continuous bit stream corresponding to the original tag bit sequence.

FIG. 12 depicts by way of example only, a typical tag recovery means such as found in the recovery/conversion means 14, 32, 62 and 82 of FIGS. 1, 3, 5, 7 and 9. The copy protected video signal (a) is supplied to a gate circuit 102 which is gated via timing input 104 during the period where the tag signal is expected. The gated video tag signal (b) is supplied to one input of a data slicer (comparator) 106, whose other input is coupled to a reference voltage VREF. The output from the data slicer 106 is depicted at (c) and is a logic level tag signal which is converted for example by the circuit(s) of FIG. 13 to the tag representation of previous mention. The configuration of the tag recovery means is a function of the tag signal format.

Figure 13:
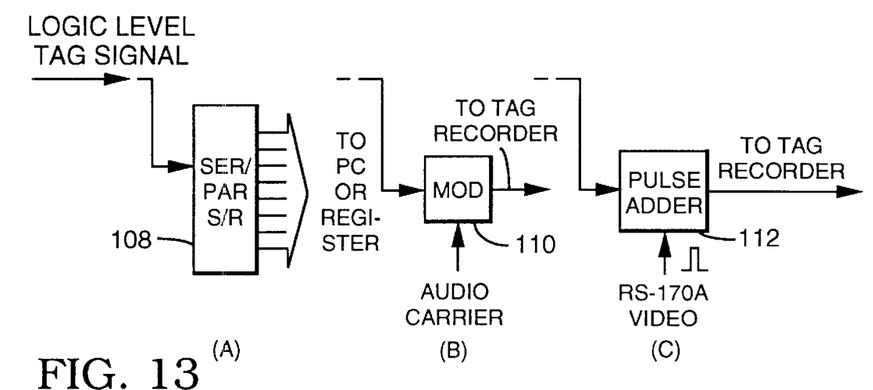
FIGS. 13A–13C are schematic diagrams illustrating several tag conversion circuits of the FIGS. 1, 3, 5, 7, 9.

FIG. 13 depicts, by way of example only, typical conversion means of the recovery/conversion means 14, 32, 62 and 82 of the figures, wherein the conversion means configuration is a function of the tag signal format. In FIG. 13(A) the logic level tag signal, supplied for example by the recovery means of FIG. 12, is supplied to a serial/parallel shift register 108, which outputs a parallel tag word for input to a personal computer, etc., as a tag representation data word. FIG. 13(B) depicts an alternative conversion wherein an audio modulator 110 with an audio carrier input, provides a modulated audio output corresponding to the tag representation, which is stored for example in a tag recording means. FIG. 13(C) depicts a pulse adder 112 receiving the logic level tag signal and an RS-170A video signal (black or an equivalent), and which outputs the tag representation to a tag recording means.

FIG. 14 depicts by way of example only, a tag synthesis means of the tag recovery/synthesis means 22, 46, 70, 98 of the figures. In FIG. 14(A) the tag representation provided as a digital word from the various tag recording or storing means (i.e., computer 64, autocorrelator 84 memory, etc.), is supplied to a parallel/serial converter 114, which in turn supplies a bit stream to an adder means 116. The means 116 corresponds generally to the adder/inserter means of the figures. The converter 114 is synchronized to the video signal first generation copy via a timing signal 118 and the regenerated tag waveform is added to the video reproduced from the first generation copy as described above. In FIG. 14(B), the stored tag representation, provided for example by the modulator 110 of FIG. 13(B), is supplied to an audio demodulator 120 which is also supplied with an audio carrier. The demodulated signal corresponding to the tag waveform is supplied to for example the adder means 116 of FIG. 14(A) where it is added to the video signal as described above. In FIG. 14(C), the stored tag representation, provided for example by the pulse adder 112 of FIG. 13(C), is supplied to a gate circuit 122 which is gated by a gate enable signal 124. The gated tag signal is supplied to a data slicer 126 and compared to VREF. The resulting logic level tag signal is added to the video signal via adder means 116 as described above.

Although the invention has been described herein relative to specific embodiments, various additional features and advantages will be apparent from the description and drawings. For example, the various recorders and reproducers may be analog or digital, and the tag representation recorder 34 and reproducer 42 could be an analog video, digital video, analog audio, digital audio and/or data recorder/reproducer. Thus the scope of the invention is defined by the following claims and their equivalents.

What is claimed is:

1. A method of restoring a tag signal in a video signal containing the tag signal and a watermark for copy protection, wherein the tag signal is removed from its location in a first generation copy to prevent unauthorized second generation copies and playback of the copies, comprising the steps of:

recovering the tag signal from the copy protected video signal;

recording the first generation copy of the video signal which includes the watermark;

concurrently saving by some suitable means the recovered tag signal; and inserting the saved tag signal into a reproduction of the first generation copy to enable the recording of a second generation copy of the video signal which is playable.

2. The method of claim 1 wherein the steps of recovering and saving include:

reading the tag signal in the copy protected video signal;

converting the recovered tag signal to a tag representation of selected format; and storing the converted tag representation for subsequent readout.

3. The method of claim 2 wherein the tag representation is an in-frame signal, a video signal, a digital data signal or an audio signal.

4. The method of claim 2 wherein the step of inserting includes:

synthesizing the stored converted tag representation to provide a regenerated tag signal; and adding the regenerated tag signal to the reproduction of the first generation copy prior to recording the second generation copy.

5. The method of claim 4 wherein the tag signal is one or more pulses in a specific location or locations in the video signal, and the step of adding restores the regenerated tag signal into the corresponding specific location or locations in the second generation copy of the video signal.

6. The method of claim 5 wherein the tag signal location or locations is in-frame or out-of-frame.

7. The method of claim 1 wherein the video signal includes blanking intervals and said tag signal is located out-of-frame and thus in a portion of the blanking intervals, and wherein:

the step of recovering includes converting the out-of-frame tag signal to an in-frame video component;

wherein the in-frame video component is added to the video signal prior to recording the first generation copy; and the step of inserting includes synthesizing a regenerated tag signal from the in-frame video component and adding the regenerated tag signal back into the reproduction of the first generation copy in the original out-of-frame location prior to recording the playable second generation copy.

8. The method of claim 7 wherein the in-frame video component location is any portion of the video signal which is actually recorded, and reproduced rather than synthesized.

9. The method of claim 7 wherein the in-frame video component includes configurations such as an amplitude modulated colored pulse, a position modulated pulse, a colored patch with tag information color modulation, and/or an audio signal.

10. The method of claim 1 wherein the tag signal comprises one or more pulses at a specific time location or locations in the video signal, wherein:

the step of recovering includes converting the tag signal to a video signal component;

the step of saving includes storing the video signal component corresponding to the tag signal in a separate storage means in synchronism with the first generation copy; and the step of inserting includes recovering the video signal component from the separate storage means, synthesizing a regenerated tag signal from the video signal component, and adding in real time the regenerated tag signal back into the reproduction of the first generation copy in the original time location or locations prior to the recording of the playable second generation copy.

11. The method of claim 10 wherein the step of converting includes:

providing amplitude or position modulation of the pulse or pulses, frequency or phase modulation of a chroma/subcarrier signal, and/or an audio signal employing any suitable modulation process and recorded on one or more audio channels of the separate storage means.

12. The method of claim 1 wherein the tag signal comprises one or more pulses at a specific time location or locations in the video signal, wherein:

the step of recovering includes converting the tag signal into a tag representation commensurate with the pulse or pulses;

the step of saving includes storing the tag representation as digital data in a storage medium in any convenient format; and the step of inserting includes reading the stored digital data, synthesizing a regenerated tag signal from the digital data in real time and adding the regenerated tag signal into the reproduced first generation copy in synchronism therewith prior to the recording of the playable second generation copy.

13. The method of claim 12 wherein the digital data is stored in a computer file or other non-volatile memory, or retained in a volatile memory.

14. The method of claim 12 wherein the steps of converting and storing are performed in a computer, wherein the video signal is first converted from analog to digital format and is stored along with the digital data in the computer's memory.

15. The method of claim 14 wherein the steps of reading, synthesizing and adding are performed in the computer.

16. The method of claim 12 wherein the steps of converting and storing are performed in a computer, wherein the video signal is first converted from analog to digital format and is stored along with the digital data in a non-volatile or volatile storage medium.

17. The method of claim 12 wherein:

the step of storing includes;

determining the exact length of an actual digital tag sequence; and storing the exact length of the actual digital tag sequence; and the step of inserting includes:

playing back the first generation copy;

simultaneously and repetitively reading the stored actual digital tag sequence to synthesize the regenerated tag signal in real time; and adding the regenerated tag signal to the reproduced first generation copy in synchronism therewith.

18. The method of claim 17 wherein the length of the actual digital tag sequence is stored in non-volatile or volatile storage medium.

19. The method of claim 17 wherein the step of determining includes:

storing a number of bits well in excess of any reasonable actual digital tag sequence length; and performing an autocorrelation process on the stored excessive number of bits to determine the actual digital tag sequence length.

20. The method of claim 17 wherein the step of determining is performed by a hardware autocorrelator.

21. The method of claim 12 wherein:

the step of storing includes;

applying the digital data to an input shift register of a hardware autocorrelator, the shift register being of length sufficient to store a sequence of bits well in excess of the expected actual digital tag sequence length;

determining the exact length of the actual digital tag sequence;

storing the exact length of the actual digital tag sequence in convenient form; and the step of inserting includes:

simultaneously and repetitively reading the stored actual digital tag sequence to synthesize the regenerated tag signal in real time; and adding the regenerated tag signal at the specific time location or locations to the reproduced first generation copy.

22. The method of claim 21 wherein the shift register is non-volatile and is configured as a circular shift register which clocks out a continuous repetition of the actual digital tag sequence.

23. A method of restoring a tag signal in a second generation and beyond playable copy of copy protected program material, wherein the tag signal is removed from its location in a first generation copy of the copy protected program material, comprising the steps of:

recovering the tag signal from the copy protected program material;

storing the recovered tag signal in a suitable manner for subsequent readout; and adding the stored tag signal, upon readout, back into a reproduced first generation copy of the program material, to allow the production of the second generation and beyond playable copy or copies.

24. The method of claim 23 including the steps of:

converting the recovered tag signal into a selected format signal;

wherein the step of storing includes storing the selected format signal; and synthesizing a regenerated tag signal from the stored selected format signal, said regenerated tag signal being added to the reproduced first generation copy.

25. The method of claim 24 wherein the selected format signal comprises an actual tag sequence of exact length, which sequence is repeated for the duration of the program material, and wherein one or more actual tag sequence(s) of exact length are stored, and read synchronously and repetitively during the step of adding.

26. The method of claim 24 wherein the program material includes out-of-frame intervals in which said tag signal is located, and wherein:

the step of converting includes converting the out-of-frame tag signal to an in-frame component; and the in-frame component is added to the copy protected program material; and the method includes the steps of:

recording the first generation copy of the program material with the added in-frame component;

synthesizing a regenerated tag signal from the in-frame component of the reproduced first generation copy; and wherein the step of adding includes adding the regenerated tag signal into the reproduced first generation copy at the original out-of-frame location.

27. The method of claim 24 wherein the tag signal comprises one or more pulses at a specific time location or locations in the program material, wherein:

the step of converting includes converting the tag signal to a video signal component; and the video signal component is stored in a separate storage means in synchronism with the first generation copy; and the step of synthesizing includes reading the video signal component from the separate storage means in synchronism with the reproduced first generation copy, and synthesizing the regenerated tag signal therefrom.

28. A method of restoring a tag signal in a video signal containing the tag signal and a watermark for copy protection, wherein the tag signal is removed in a first generation copy of the video signal, comprising the steps of:

recovering the tag signal from an out-of-frame location;

converting the out-of-frame tag signal to an in-frame video component;

adding the in-frame video component to the video signal prior to recording the first generation copy;

recording the first generation copy with the in-frame video component and the watermark;

synthesizing an out-of-frame tag signal from the recorded in-frame video component; and adding the out-of-frame tag signal back into a reproduction of the first generation copy prior to recording a second generation copy thereof which is playable.

29. The method of claim 28 wherein the synthesized out-of-frame tag signal is added to the reproduction of the first generation copy in the original out-of-frame location in the video signal.

30. A method of restoring a tag signal in a video signal containing the tag signal and a watermark for copy protection, wherein the tag signal is removed in a first generation copy of the video signal, comprising the steps of:

recovering the tag signal from the video signal;

converting the tag signal into a tag representation of the tag signal;

storing the tag representation in a storage medium in any convenient format;

recording the first generation copy with or without the tag signal;

synthesizing a regenerated tag signal from the stored tag representation;

adding the regenerated tag signal into a reproduction of the first generation copy prior to recording a second generation copy thereof which is playable.

31. The method of claim 30 wherein the tag signal comprises one or more pulses at a specific time location in the video signal, and the regenerated tag signal is added into the reproduction of the first generation copy in the original location in the video signal.

32. A method of restoring a tag signal in a video signal containing the tag signal and a watermark for copy protection, wherein the tag signal is removed from its location in a first generation copy to prevent unauthorized second generation copies and playback of the copies, comprising the steps of:

saving a version of the tag signal from the copy protected video signal;

recording the first generation copy which is not copiable;

reproducing the uncopiable first generation copy;

synthesizing a regenerated tag signal from the saved version of the tag signal; and providing the first generation copy with the synthesized regenerated tag signal to enable producing a second generation copy.

33. The method of claim 32 wherein:

the step of saving includes recovering the tag signal and converting the recovered tag signal to said version thereof; and the step of providing includes inserting the regenerated tag signal in the first generation copy prior to producing the second generation copy.

34. The method of claim 33 wherein the tag signal is an out-of-frame tag, wherein:

the step of converting includes converting the out-of-frame tag to an in-frame tag representation;

adding the in-frame tag representation to the video signal prior to recording the first generation copy;

synthesizing the regenerated tag signal from the in-frame tag representation; and adding the synthesized regenerated tag signal to the reproduced first generation copy in the out-of-frame location.

35. The method of claim 33 wherein:

said version is a tag representation which is stored in a suitable storage medium concurrently with recording the first generation copy; and the regenerated tag signal is synthesized from the stored tag representation and is added to the reproduced first generation copy.

36. The method of claim 32 wherein the tag version is stored in the video signal.

37. The method of claim 32 wherein the tag version is stored in a suitable storage medium.

38. Apparatus for restoring a tag signal in a second generation copy of a video signal containing the tag signal and a watermark for copy protection, wherein the tag signal is removed from its location in a first generation copy of the copy protected video signal, comprising:

means for saving a version of the tag signal concurrently with recording the first generation copy;

means for reproducing the recorded first generation copy;

means for synthesizing a regenerated tag signal from the saved version of the tag signal; and inserter means for adding the regenerated tag signal to the reproduced first generation copy prior to producing the second generation copy which now is playable.

39. The apparatus of claim 38 wherein the saving means includes:

autocorrelator means for determining the exact length of an actual digital tag sequence forming the version of the tag signal; and wherein the synthesizing means repetitively and synchronously provides the actual digital tag sequence to generate the regenerated tag signal added via the inserter means.

40. The apparatus of claim 39 wherein the autocorrelator means is a hardware autocorrelator.

41. The apparatus of claim 40 wherein the hardware correlator includes:

a shift register of length sufficient to store a sequence of bits well in excess of the actual digital tag sequence length;

an array of logic gates coupled to the shift register; and a decision unit including accumulator means coupled to the array of logic gates for indicating the exact length of the actual digital tag sequence.

42. The apparatus of claim 38 wherein:

the means for saving include a tag recovery circuit, a conversion circuit for converting the recovered tag signal to a tag representation corresponding to the version, and a storage means for saving the tag representation.

43. The apparatus of claim 42 wherein the tag representation is saved in the video signal concurrently with recording the first generation copy.

44. The apparatus of claim 42 wherein the tag representation is stored in a suitable storage means concurrently with recording the first generation copy.

45. The apparatus of claim 42 wherein the tag signal is one or more pulses in a specific location or locations in the copy protected video signal, and the inserter means adds the regenerated tag signal into the corresponding specific location or locations in the reproduced first generation copy prior to recording the second generation copy.

46. The apparatus of claim 42 including:

a recorder/reproducer for recording and reproducing the first generation copy; and a synthesis circuit coupled to the recorder/reproducer for generating the regenerated tag signal in synchronism with the reproduced first generation copy.

47. The apparatus of claim 42 wherein the tag signal is located out-of-frame in the copy protected video signal, wherein:

the conversion circuit converts the out-of-frame signal to an in-frame video component;

the storage means saves the in-frame video component in the copy protected video signal concurrently with recording the first generation copy thereof;

the synthesizing means generates the regenerated tag signal in the form of the original out-of-frame tag signal; and the inserter means adds the regenerated out-of-frame tag signal to the reproduced first generation copy in its original location.

48. The apparatus of claim 42 wherein the storage means comprises a computer file or other non-volatile memory, or a volatile memory which is not turned off during the storage period.

49. The apparatus of claim 42 wherein the means for saving, the means for synthesizing and the inserter means comprise a computer.

50. The apparatus of claim 42 wherein:

the tag recovery and conversion circuits determine the exact length of an actual digital tag sequence;

the storage means store the actual digital tag sequence; and the synthesizing means repetitively and synchronously read the stored actual digital tag sequence from the storage means to generate the regenerated tag signal which is added via the inserter means.

51. The apparatus of claim 50 wherein the tag recovery and conversion circuits include:

means for storing a number of bits well in excess of any reasonable number of bits forming the actual digital tag sequence length; and means for performing an autocorrelation process on the stored excessive number of bits to determine the actual digital tag sequence length.

* * * * *